United States Patent [19]

Abiven

[11] Patent Number: 5,644,208
[45] Date of Patent: Jul. 1, 1997

[54] BATTERY COMPRISING A PLURALITY OF CELLS, IN PARTICULAR LITHIUM-ION CELLS, CONNECTED IN SERIES

[75] Inventor: Benoît Abiven, Asnieres, France

[73] Assignee: Alcatel Mobile Phones, Paris, France

[21] Appl. No.: 695,025

[22] Filed: Aug. 9, 1996

[30] Foreign Application Priority Data

Aug. 11, 1995 [FR] France ............................ 95 09764

[51] Int. Cl.⁶ .............................. H02J 7/00; H01M 10/44
[52] U.S. Cl. ........................... 320/6; 320/7; 320/15; 320/16; 320/56
[58] Field of Search ......................... 320/17, 18, 6–7, 320/15–16, 56

[56] References Cited

U.S. PATENT DOCUMENTS

| | | | |
|---|---|---|---|
| 4,081,738 | 3/1978 | Roller | 320/7 |
| 4,139,812 | 2/1979 | Huggins | 320/7 |
| 5,369,351 | 11/1994 | Adams | 320/7 |
| 5,530,337 | 6/1996 | Yamamoto | 320/6 |

FOREIGN PATENT DOCUMENTS

| | | |
|---|---|---|
| 0017892A1 | 10/1980 | European Pat. Off. . |
| 0512340A1 | 11/1992 | European Pat. Off. . |
| 2089592 | 6/1982 | United Kingdom . |
| 2282924 | 4/1995 | United Kingdom . |

OTHER PUBLICATIONS

*Patent Abstracts Of Japan*, vol. 14, No1. 259 (E–0937) dated Mar. 20, 1990 corresponding to JP–A–02 079730 (Matsushita) dated Mar. 20, 1990.

*Patent Abstracts Of Japan*, vol. 95, No. 003 corresponding to JP–A–07 059266 (Toshiba Corp.) dated Mar. 3, 1995.

Primary Examiner—Peter S. Wong
Assistant Examiner—K. Shin
Attorney, Agent, or Firm—Sughrue, Mion, Zinn, Macpeak & Seas

[57] ABSTRACT

A battery comprises a plurality of cells, in particular lithium-ion cells, connected in series and having two external connection contacts constituting charging/discharging contacts. A switch between the cells, in the electrical circuit connecting them, is open when the battery is being charged and closed when the battery is being discharged. On either side of each switch is an external charging contact for connection to a separate charging circuit for each cell. Each charging/discharging contact also constitutes a charging contact for the cell that is directly connected to it.

1 Claim, 1 Drawing Sheet

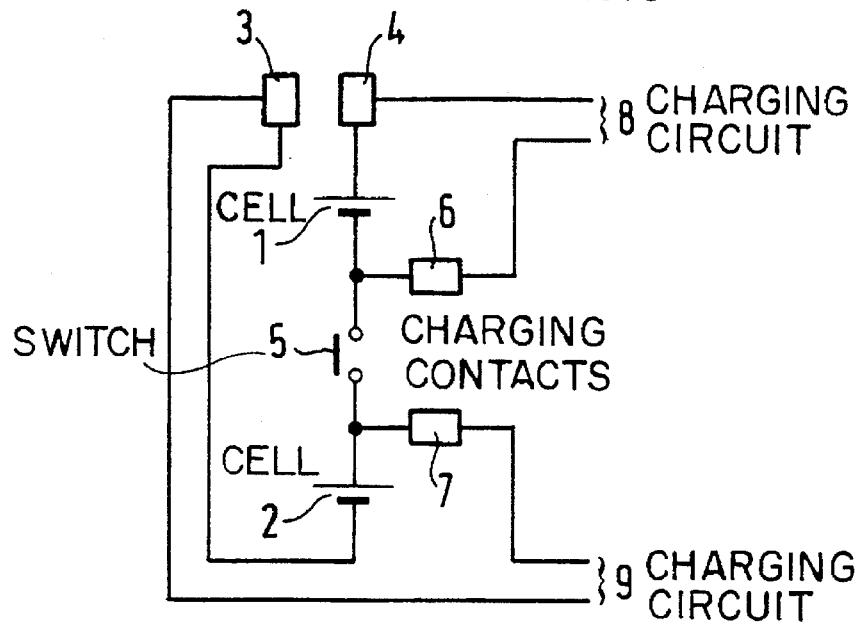
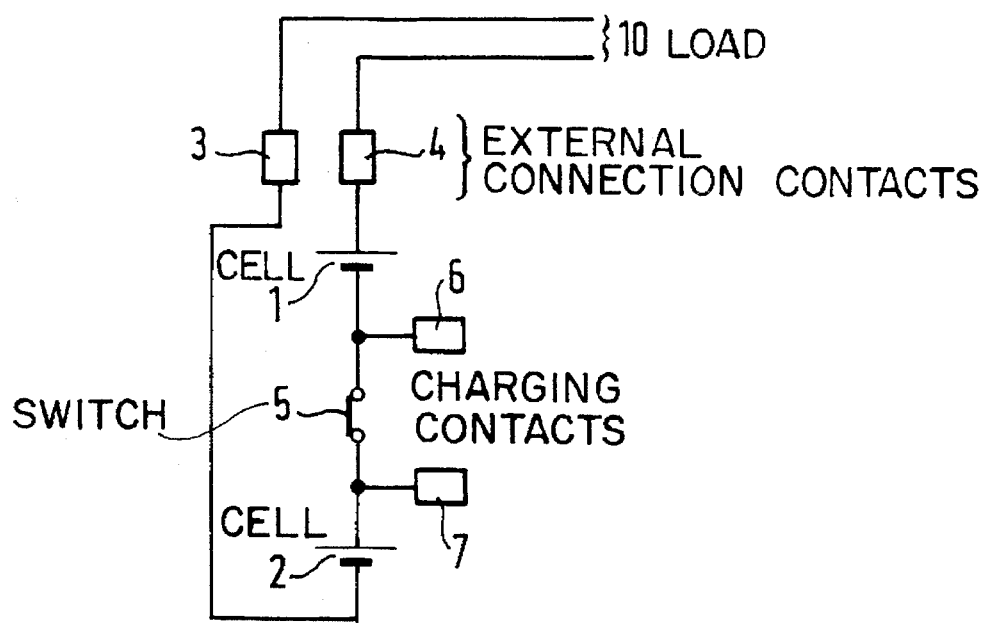

BATTERY COMPRISING A PLURALITY OF CELLS, IN PARTICULAR LITHIUM-ION CELLS, CONNECTED IN SERIES

BACKGROUND OF THE INVENTION

1. Field of the Invention

The present invention concerns a battery and in particular a battery comprising a plurality of cells, in particular lithium-ion cells, connected in series.

The present invention is more specifically concerned with the charging of a battery of this kind.

2. Description of the Prior Art

If a battery of this kind is charged using a single charging circuit connected to the external connection contacts of the battery, in the usual way, and if said cells are not perfectly identical, as is usually the case, one cell may charge faster than the others and therefore be damaged if charging is continued, even though the other cells have not reached their maximum charge. This is the case with the lithium-ion technology, for example.

To prevent this an electronic monitoring system is generally employed so that as soon as the voltage across one cell begins to rise relative to the voltage across the other cells the current charging that cell is limited in order to avoid damaging the cell.

A particular drawback of a solution of this kind is that it is relatively complex and costly.

A particular aim of the present invention is to avoid this drawback.

SUMMARY OF THE INVENTION

Accordingly, the present invention consists in a battery comprising a plurality of cells, in particular lithium-ion cells, connected in series and having two external connection contacts constituting charging/discharging contacts and, between said cells, in the electrical circuit connecting them, a switch adapted to be open when the battery is being charged and closed when the battery is being discharged, and, on either side of each of said switches, an external charging contact for connection to a separate charging circuit for each of said cells, each of said charging/discharging contacts also constituting a charging contact for the cell that is directly connected to it.

Other objects and features of the present invention will emerge from a reading of the following description of one embodiment given with reference to the appended drawings.

BRIEF DESCRIPTION OF THE DRAWINGS

FIG. 1 is a diagram showing a battery of the invention being charged.

FIG. 2 is a diagram showing a battery of the invention being discharged.

DETAILED DESCRIPTION OF THE PREFERRED EMBODIMENT

The battery shown in FIGS. 1 and 2 comprises two lithium-ion cells 1 and 2 connected in series.

The battery has two external connection contacts 3 and 4 referred to herein as charging/discharging contacts.

In accordance with the invention, the battery further comprises, between the cells 1 and 2 and in the electrical circuit connecting them, a switch 5 adapted to be open (as shown in FIG. 1) while the battery is charging and closed (as shown in FIG. 2) while the battery is discharging.

In accordance with the invention, the battery further comprises a respective charging contact 6 and 7 enabling each cell to be connected to a respective charging circuit 8 and 9.

Each of said charging/discharging contacts 3 and 4 is used as a discharging contact to connect the battery to a device 10 powered by the battery and also as a charging contact for the respective cell 1 and 2 connected directly to it.

Thus the charging circuit 8 is connected between the charging contacts 3 and 7 and the charging circuit 9 is connected between the charging contacts 4 and 6.

With an arrangement of this kind, each cell being charged separately, the problem of damage to the cells mentioned above is eliminated by virtue of a solution that is relatively simple to implement and low in cost.

There is claimed:

1. Battery comprising a plurality of cells, in particular lithium-ion cells, connected in series and having two external connection contacts constituting charging/discharging contacts and, between said cells, in the electrical circuit connecting them, a switch adapted to be open when the battery is being charged and closed when the battery is being discharged, and, on either side of each of said switches, an external charging contact for connection to a separate charging circuit for each of said cells, each of said charging/discharging contacts also constituting a charging contact for the cell that is directly connected to it.

* * * * *